US011099650B1

(12) United States Patent
Haynold (10) Patent No.: US 11,099,650 B1
(45) Date of Patent: Aug. 24, 2021

(54) CAMERA WITH IMPROVED SHUTTER BUTTON

(71) Applicant: Oliver Markus Haynold, Evanston, IL (US)

(72) Inventor: Oliver Markus Haynold, Evanston, IL (US)

(*) Notice: Subject to any disclaimer, the term of this patent is extended or adjusted under 35 U.S.C. 154(b) by 0 days.

(21) Appl. No.: 16/127,233

(22) Filed: Sep. 11, 2018

Related U.S. Application Data

(62) Division of application No. 15/256,712, filed on Sep. 5, 2016, now abandoned.

(60) Provisional application No. 62/217,933, filed on Sep. 13, 2015, provisional application No. 62/215,134, filed on Sep. 7, 2015.

(51) Int. Cl.
| | |
|---|---|
| *G06F 3/01* | (2006.01) |
| *H04N 5/232* | (2006.01) |
| *H04N 5/235* | (2006.01) |
| *G06F 3/0488* | (2013.01) |
| *G06F 3/044* | (2006.01) |
| *G06F 3/041* | (2006.01) |

(52) U.S. Cl.
CPC ............ *G06F 3/016* (2013.01); *G06F 3/044* (2013.01); *G06F 3/0416* (2013.01); *G06F 3/0488* (2013.01); *H04N 5/2353* (2013.01); *H04N 5/23216* (2013.01); *H04N 5/23293* (2013.01); *G06F 2203/04105* (2013.01); *H04M 2250/52* (2013.01)

(58) Field of Classification Search
CPC ........ G06F 3/016; G06F 3/0416; G06F 3/044; G06F 3/0488; G06F 2203/04105; H04N 5/23216; H04N 5/23293; H04N 5/2353; H04M 2250/52

USPC .................................................... 348/333.01
See application file for complete search history.

(56) References Cited

U.S. PATENT DOCUMENTS

| | | | |
|---|---|---|---|
| 4,314,750 A | 2/1982 | Orban | |
| 6,055,377 A | 4/2000 | Miyadera | |
| 7,916,002 B2 | 3/2011 | Uusitalo | |
| 8,058,571 B2 * | 11/2011 | Rajagopal | ............ H01H 13/503 200/1 B |
| 8,378,240 B2 * | 2/2013 | Rajagopal | .............. H01H 13/48 200/1 B |
| 8,659,555 B2 | 2/2014 | Pihlaja | |
| 9,313,304 B1 * | 4/2016 | Haynold | ............ H04N 5/23245 |
| 9,696,859 B1 * | 7/2017 | Heller | .................... G06F 3/0346 |
| 9,760,241 B1 * | 9/2017 | Lewbel | .................. G06F 3/041 |
| 9,846,508 B2 * | 12/2017 | Anzures | ................ G06F 3/0416 |

(Continued)

FOREIGN PATENT DOCUMENTS

| | | |
|---|---|---|
| CN | 102404509 A | 4/2012 |
| EP | 2123212 A2 | 11/2009 |

*Primary Examiner* — Pritham D Prabhakher (57) ABSTRACT

According to some embodiments, a portable apparatus is equipped with at least one user control element, at least one sensor, and at least one tactile feedback actuator, such as a camera with a shutter button, an image sensor, and a tactile feedback actuator. Upon the user's actuation of the button, a sensor reading is taken, which may take some amount of time. Successful completion is indicated by the tactile feedback unit. According to some embodiments, the button is a force sensor capable of distinguishing more than two different levels of force with which it is being actuated, and tactile feedback is provided to distinguish between different levels of actuation. Other possibilities are shown and discussed.

14 Claims, 6 Drawing Sheets

(56) References Cited

U.S. PATENT DOCUMENTS

| | | | |
|---|---|---|---|
| 9,886,184 B2* | 2/2018 | Bernstein | G06F 3/0482 |
| 9,891,738 B2* | 2/2018 | Huppi | G06F 3/023 |
| 9,910,494 B2* | 3/2018 | Westerman | G06F 3/016 |
| 10,440,288 B2* | 10/2019 | Windmark | H04N 5/232933 |
| 10,452,253 B2* | 10/2019 | Yang | G06F 3/0485 |
| 10,620,781 B2* | 4/2020 | Bernstein | G06F 3/04815 |
| 2004/0239767 A1 | 12/2004 | Stavely et al. | |
| 2008/0122945 A1* | 5/2008 | Ahonen | H04N 5/2354 348/223.1 |
| 2010/0084251 A1* | 4/2010 | Rajagopal | H01H 13/503 200/5 A |
| 2014/0362274 A1 | 12/2014 | Christie et al. | |
| 2015/0062078 A1* | 3/2015 | Christman | A61B 5/6897 345/174 |
| 2015/0067513 A1* | 3/2015 | Zambetti | G06F 3/0488 715/716 |
| 2015/0135108 A1 | 5/2015 | Pope et al. | |
| 2015/0153929 A1 | 6/2015 | Bernstein et al. | |
| 2015/0334292 A1 | 11/2015 | Tartz et al. | |
| 2015/0350147 A1 | 12/2015 | Shepherd et al. | |
| 2016/0117147 A1 | 4/2016 | Zambetti et al. | |
| 2016/0191337 A1 | 6/2016 | Schiewe | |
| 2016/0259542 A1 | 9/2016 | Chaudhri et al. | |
| 2017/0064213 A1* | 3/2017 | Windmark | H04N 5/232 |

\* cited by examiner

CAMERA WITH IMPROVED SHUTTER BUTTON

RELATED APPLICATIONS

This application is a divisional of and claims the benefit of priority from my Utility patent application Ser. No. 15/256,712 for an Apparatus with Tactile Feedback, filed on 5 Sep. 2016, which in turn claims priority from my Provisional Patent Application 62/215,134, filed on 7 Sep. 2015, for a Camera with Touch-Sensitive Shutter, as well as from my Provisional Patent Application 62/217,933, filed on 13 Sep. 2015, for a Camera with Reactive Shutter Button. All three applications mentioned are hereby incorporated in full into this application by reference.

FIELD OF THE INVENTION

This invention relates to the field of controlling a camera through a shutter button.

PRIOR ART

The following is a tabulation of some patent documents that appear relevant:

U.S. Patents

| U.S. Pat. No. | Kind Code | Issue Date | Patentee |
| --- | --- | --- | --- |
| 4,314,750 | A | 1982 Feb. 9 | Orban |
| 6,055,377 | A | 2000 Mar. 25 | Miyadera |
| 7,916,002 | $B_2$ | 2011 Mar. 29 | Uusitalo & Makela |
| 8,659,555 | $B_2$ | 2014 Feb. 25 | Pihlaja |
| 9,313,304 | $B_1$ | 2016 Apr. 12 | Haynold |

U.S. patent application Publications

| Publication No. | Kind Code | Publication Date | Applicant |
| --- | --- | --- | --- |
| 2004,0239,767 | $A_1$ | 2004 Dec. 2 | Stavely et al. |
| 2008,0122,945 | $A_1$ | 2008 May 29 | Ahonen |
| 2015,0334,292 | $A_1$ | 2015 Nov. 19 | Tartz et al. |

Foreign Application Publications

| Publication No. | Kind Code | Publication Date | Applicant |
| --- | --- | --- | --- |
| CN 102404509 | A | 2012 Apr. 4 | Shiyong |
| EP 2123212 | $A_2$ | 2009 Nov. 25 | Gebhardt & Maier |

BACKGROUND

Over the past decades, we have seen a proliferation of portable electronic devices equipped with a large array of sensors. In particular, smartphones have become ubiquitous and are equipped with cameras of ever greater sophistication while becoming ever more powerful and smaller. While there are some physical limitations to what a miniaturized camera can do compared to a larger one capable of capturing more light from a larger lens, for many practical applications the cameras integrated into smartphones now surpass the capabilities larger dedicated cameras had only a decade or two ago. However, the increasing miniaturization of portable cameras, as well as other sensor-equipped apparatuses, poses problems in creating a user interface that is as quick to use as the traditional user interfaces of larger devices. In particular, traditional cameras tend to be equipped with a half-press shutter button, allowing photographers to lock exposure parameters and then to recompose a picture before taking a photograph. My U.S. Pat. No. 9,313,304, issued on 12 Apr. 2016, teaches way to improve the usability of miniaturized cameras, especially those integrated into smartphones, but there remains an ongoing need for further improvements, in particular as traditional buttons on smartphones are being replaced by touchscreens.

SUMMARY

According to some embodiments, a portable apparatus is equipped with at least one user control element, at least one sensor, and at least one tactile feedback actuator, such as a camera with a shutter button, an image sensor, and a tactile feedback actuator. Upon the user's actuation of the button, a sensor reading is taken, which may take some amount of time. Successful completion is indicated by the tactile feedback unit. According to some embodiments, the button is a force sensor capable of distinguishing more than two different levels of force with which it is being actuated, and tactile feedback is provided to distinguish between different levels of actuation. Other possibilities are shown and discussed.

ADVANTAGES

Some advantages of some embodiments include:
a) The user is provided with tactile feedback once a picture has been taken, providing positive confirmation of the shutter release.
b) Camera shake is reduced while still providing good tactile feedback of the shutter release.
c) In applications with a noticeable lag between shutter release and the picture-taking being finished, such as with long exposure times, the user gets tactile confirmation of the moment when the picture has been taken.
d) The user obtains positive tactile feedback of a shutter release even though the shutter button switch itself cannot provide such feedback, be it because it is made of a design that cannot do so for cost reasons or because it is a touchscreen.
e) It is possible to use a shutter button with forceless actuation, such as a capacitive touch sensor, thus reducing camera shake from forcible shutter actuation, while still providing tactile feedback of the shutter being released, reducing the button's size, and increasing resistance to mechanical abuse and the elements.

DRAWINGS—REFERENCE NUMERALS

100 Enclosure
102 Touchscreen
104 Camera (facing away from user)
106 Volume down button
108 Volume up button/shutter button 110 Focus indicator shown on touchscreen
112 User's left hand
114 User's right hand
116 Control button
118 Virtual shutter button on touchscreen
120 Tactile feedback unit
200 Tactile feedback unit enclosure
202 Stationary impact mass
204 Spring
206 Piezoelectric actuator
208 Actuator lead
210 Actuator lead
212 Impact mass
300-322 labeled on drawing
400-422 labeled on drawing
500-540 labeled on drawing
600-620 labeled on drawing

DETAILED DESCRIPTION

First Embodiment—FIGS. 1-4

There is a fundamental choice to make in selecting one of the shutter button designs known to the prior art. A conventional shutter button either has a distinct tactile pressure point or it does not. A distinct pressure point, characterized by a sudden decrease in the mechanical resistance the shutter button imposes on its user pressing the button down once the button has been depressed deeply enough to cause an actuation to be registered, is highly desirable from an ergonomical point of view. The user can feel and possibly hear a click and immediately knows that he has successfully depressed the shutter button. While mechanical switches with very nicely tactile pressure points are available, such as miniature snap-action switches, there is a downside to having this tactile feedback: the sudden decrease of the shutter's resistance to pressure will introduce a jerking motion in the camera just as the shutter button is being actuated and the picture is being taken. If an area of a touchscreen is used as a shutter button instead of a physical button, it is usually not possible to provide tactile feedback from the button itself since most touchscreens, even if capable of differentiating pressure, are not capable of providing distinct tactile feedback. As an additional consideration, there is an increasing pressure to make portable devices ever smaller and resistant to abuse and the elements, and this can be difficult to achieve with traditional mechanical switches that typically use a length of travel of the switch to provide tactile feedback, thus requiring space for that length of travel and creating a hollow space that may provide a path for intrusion of water and dirt as well as for things to break under physical abuse.

Some cameras attempt to give the user auditory instead of tactile feedback by playing a sound, such as the sound of a traditional film-based camera, when a picture is being taken. This, however, can be quite obtrusive and users will typically switch this function off when, for example, taking pictures at a wedding or at an art venue.

At any rate, there is something unsatisfactory about the tactile feedback provided by a traditional shutter button on an electronic camera. Even with a nicely tactile button, the user only gets feedback that he has successfully depressed the shutter button, but not that a picture has been taken successfully. This is in contrast with a traditional mechanical camera where the user often can feel in his hands as well as hear the operation of the shutter, thus knowing that a picture has indeed been taken (as much as one can know this on a mechanical camera-operating the camera without a properly inserted film and such is a different story, as many an older photographer can attest to). It is, therefore, desirable to have a new type of tactile feedback for electronic cameras that does not disrupt the shot being taken and confirms that the shot indeed has been taken.

Figure 1:
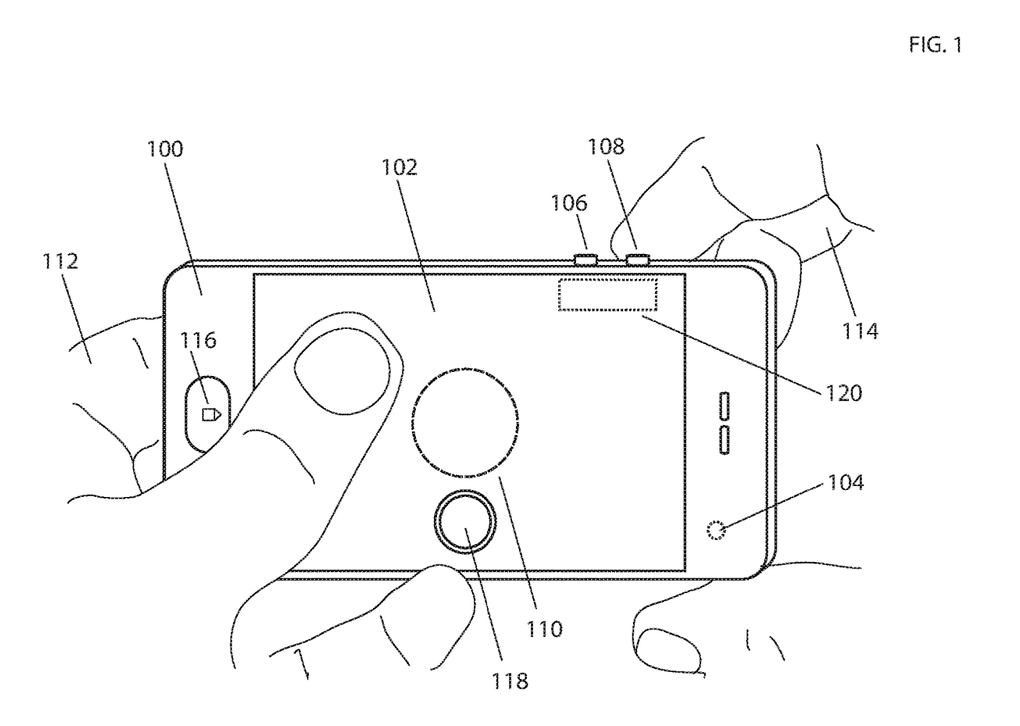
FIG. 1 shows a view of the first embodiment in use.
Figure 2:
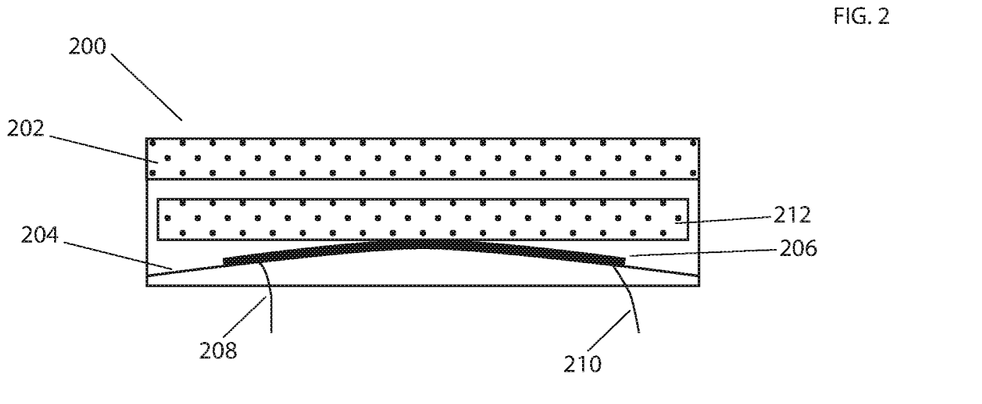
FIG. 2 shows the tactile feedback unit of the first embodiment.
Figure 3:
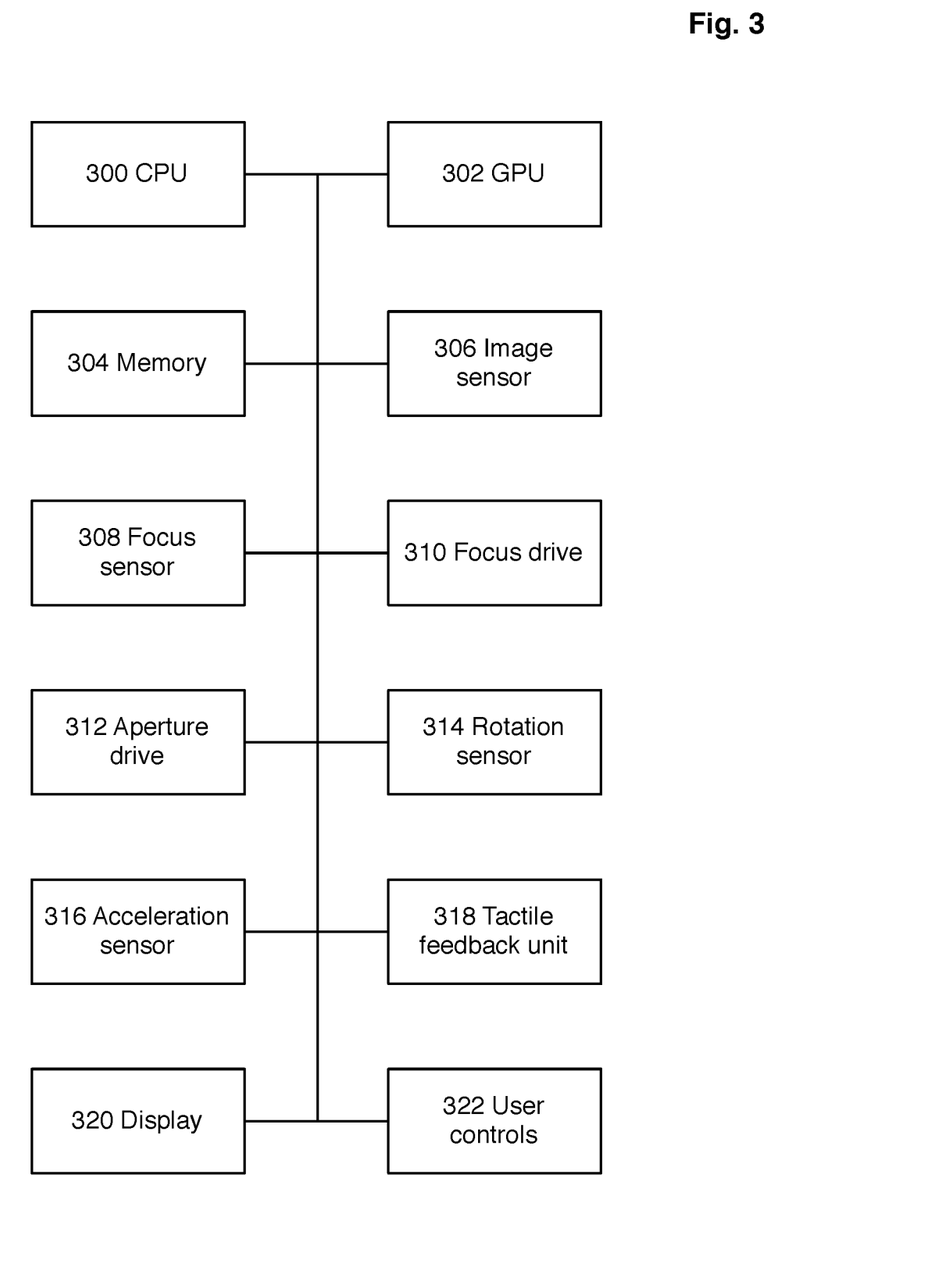
FIG. 3 shows some components of the first embodiment.

Physical Construction—FIGS. 1-3

FIG. 1 shows an outside view of the first embodiment, which may be a smartphone or a portable multimedia player or may also be a dedicated camera. The device may have different operating modes, such as a camera mode, a video player mode, a picture viewing mode, and a telephone mode. In the enclosure 100, there is a touchscreen 102 which may be the main control element of user interaction; in the camera mode, the touchscreen may show a preview of the picture to be taken overlaid with some virtual control elements and indicators. There is a camera module 104, facing away from the user. A volume down button 106 serves to reduce volume in some operating modes, and a volume up button 108 serves to increase volume in some operating modes. In the camera operating mode, the volume up button 108 may be configured to work as a shutter button. A focus point of interest indicator 110 may indicate which part of the image the camera's autofocus tries to keep in focus. The user is holding the device with his left hand 112 and his right hand 114. A button 116 may serve additional functions, and more user control elements may be provided. A virtual shutter button 118 on the touchscreen 102 may be used instead of the volume up button 108 as a shutter button, depending on the user's preference. A tactile feedback unit 120 inside the device may provide tactile feedback to the user. The tactile feedback unit 120 may be placed near the volume up button 108. Volume up button 108 and volume down button 106 may be chosen to have little or no tactile feedback, for example by being made as rubber-dome switches or by being made as capacitive touch sensors, or they may be chosen to provide some tactile feedback, for example by being made as steel-dome switches; in the latter case, the tactile feedback provided should not be excessive, so as to avoid introducing camera shake on actuation.

FIG. 2 shows one possible design of the tactile feedback unit 120. Inside a small enclosure 200, there is an stationary impact mass 202, which may be made of steel. A spring 204 is bonded to a piezoelectric actuator 206, which has two electric leads 208 and 210. By applying power to the leads, the actuator bends itself and the spring 204, accelerating the impact mass 212 upward until it hits the stationary impact mass 202, which creates a noticeable clicking sensation for the user holding the device. It can be particularly advantageous to mount the volume up button 108 on the enclosure 200 so that the clicking sensation is transmitted directly to the button. The piezoelectric actuator 208 may be controlled by the device's CPU through a GPIO pin and an appropriately chosen driver, which may be a MOSFET. The components of the tactile feedback unit may be arranged differently or a different principle of tactile feedback units may be used, such as one based on a voicecoil actuator or even simply a common yoke relay of a small form factor, with the relay contacts being unused other than for their tactile and audible feedback when the relay coil is being powered. Whatever principle of operation is chosen, the unit may generate a tactile click that the user can feel and a small clicking sound upon actuation by the CPU. The control logic may be adapted to generate clicks of different strengths or feel by varying the driving voltage, the time during which it is applied, pulse-width modulation of the driving voltage, or other means, as appropriate for the tactile actuator chosen.

Although it is possible to use a tactile feedback actuator that provides a vibration, such as a linear resonant actuator or an eccentric rotating mass actuator, it is advantageous to use an actuator that can generate distinct clicks. A click is a distinctly noticeable, but very short, event, whereas it takes some time to notice a vibration, which means that a vibration actuator needs to run for some time, which is inconvenient for quick follow-up shots. Also, a click is more intuitive as confirmation of a photo being taken because mechanical cameras, with which many photographers learned their skills, make clicks on shutter actuations. Further, clicking tactile feedback actuators tend to have much lower latency times than vibrating ones, which is advantageous for quick feedback. By combining several clicks in quick succession, it is possible to generate a vibrating sensation, which may, for example, be useful as an error indicator, and by varying the intensity of actuation of the actuator, such as by pulse-width modulation of the driving signal or variation of the driving signal's voltage, it is possible to vary the strength of the tactile feedback.

FIG. 3 shows an electronic bus connecting some components of the device. There is a CPU 300, a GPU 302, memory 304 which may comprise RAM and flash memory, an image sensor 306, a focus sensor 308, a focus drive 310, an aperture drive 312, a microelectromechanical rotation sensor 314, an acceleration sensor 316, the tactile feedback unit just discussed 318, the touchscreen 320, and various user controls 322, such as the buttons 106, 108, and 116. Although shown here for simplicity as being connected by a single bus, the components may be connected by more than one bus or by architectures other than a bus; not all components shown need be present and other components may be present.

Figure 4:
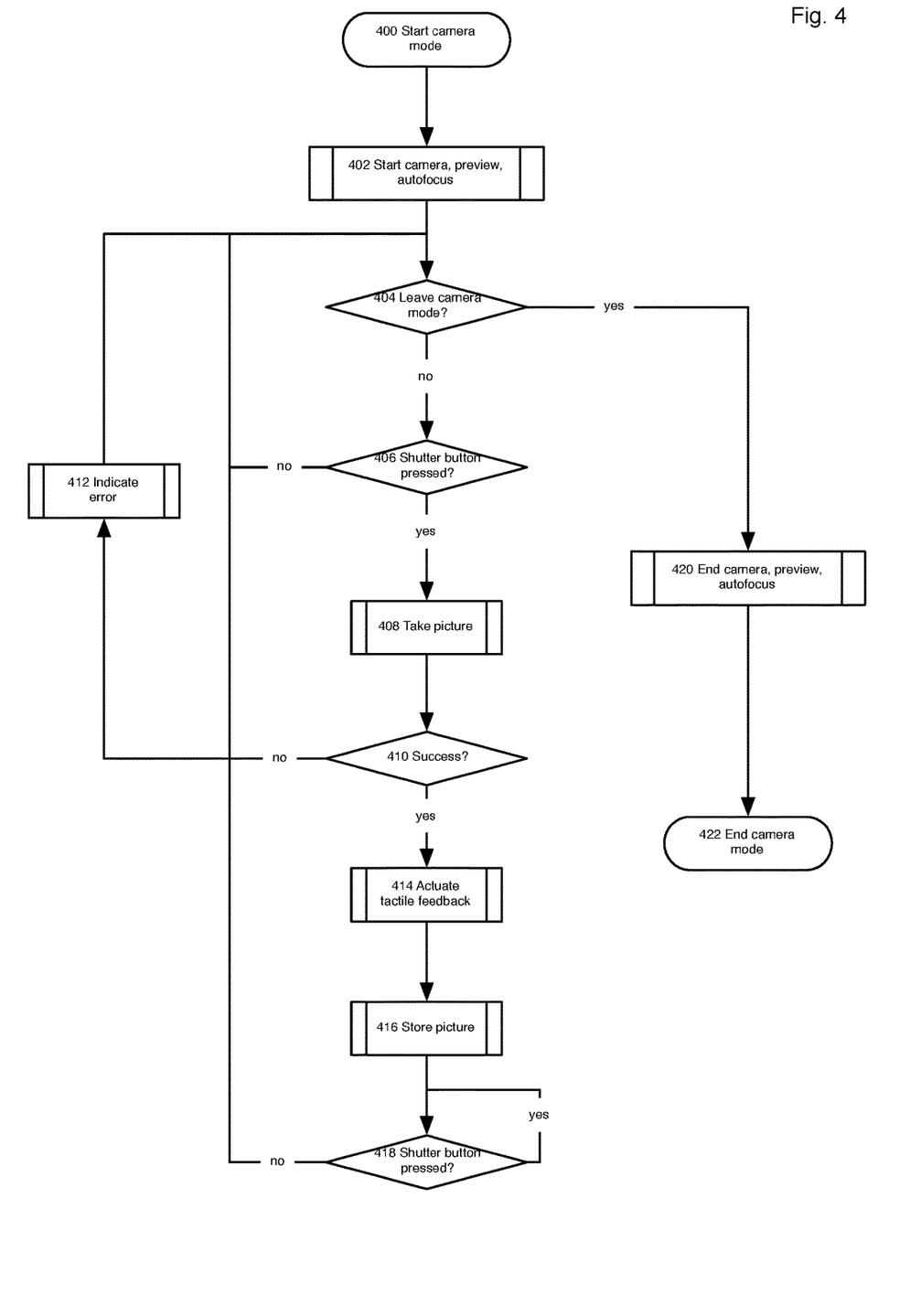
FIG. 4 shows the control flow for the first embodiment.

Control Flow and Operation—FIG. 4

FIG. 4 shows the control flow of the device in camera mode as it relates to actuation of the shutter button and tactile feedback. Step 400 is the start of camera mode, which may occur on device startup if the device is primarily intended for use as a camera or by the user making a menu or icon selection on a device primarily used as a smartphone or multimedia player. In step 402, the software starts the camera and the preview which shows live pictures taken by the camera on the touchscreen. The software may also continuously show control elements or information, such as image-taking parameters or a histogram, overlaid with or next to the preview. Step 402 may also initialize the camera's continuous autofocus whereby the camera tries to keep the part of the image marked by indicator 110 in focus, as well as automatic exposure adjustment whereby the camera continuously adjusts at least one of aperture, exposure time, and sensor sensitivity so as to keep the image properly exposed. These functions may be implemented in a separate thread of control or even on a separate processor. There may also be additional focus and exposure modes, such as the possibility to lock focus and exposure for recomposing the image, such as by a press on button 106, or exposure modes where at least one of the three exposure parameters mentioned gets selected manually by the user.

In step 404 there is a check whether the user wants to leave the camera mode, such as by pressing the button 116 or by pressing a dedicated power button. If so, step 420 switches the camera module and preview function off and proceeds to step 422, which ends the camera mode and may provide additional functions such as showing a menu on the screen or powering the device off.

Step 406 checks whether the user pressed the shutter button. This may be either the user depressing the volume up button 108 or touching the on-screen shutter button 118. There may also be additional or different possibilities for a shutter release, such as a dedicated shutter button that may have half-press functionality, or a condition that a touch on the on-screen button 118 only is taken as a shutter release when it has sufficient force, provided that the touchscreen is equipped with a force sensor. There may even be a functionality whereby the user does not have to actuate any control element but, for example, recognition of a face would be taken as a shutter actuation. If the shutter button is not being actuated, control flow reverts to step 404.

Whichever of the possibilities mentioned is used as the shutter button, when the user actuates it, control flow proceeds to step 408, which takes a picture from the camera and reads it into volatile memory. Once the picture has been read into memory, it is taken, and disruption of the camera will no longer cause blur or other problems in the picture. Step 408 may proceed very quickly; for example, if a short exposure time is selected, the autofocus is already set correctly, and the camera module is capable of quickly reading out the image sensor, step 408 may proceed in a little as one hundredth of second. However, in some cases step 408 may take much longer. For example, if the autofocus takes some time finding the right setting in a low-contrast environment or if a long exposure time is set, either manually or by the autoexposure mode, step 408 may take several seconds. Step 408 may also fail immediately, for example if there is a defect in the camera module of if insufficient memory to store the image is available, either in RAM or on the non-volatile flash memory. Step 408 may also fail with a timeout, for example if after several seconds of autofocus operation no autofocus setting is found.

Step 410 checks whether step 408 was successful. If so, control proceeds to step 414 as discussed in the next paragraph. If not, control goes to step 412 which indicates the error, for example by displaying a prominent error message on the touchscreen. From there, control goes back to step 404. If the error is non-recoverable, such as by lack of memory or hardware defect, control may also remain in step 412 and simply permanently display an error message until such error is remedied. Step 412 may also use means other than optical to indicate such error, for example by playing an error sound, or a tactile signal that is clearly distinct from that generated by step 414 discussed below, for example a vibration signal.

Once the picture is successfully read from the camera, step 414 actuates the tactile feedback unit 120/200. This causes the user to feel a noticeable click which may also be audible. The user now knows that the picture has been safely taken. Step 416 stores the picture to non-volatile memory after appropriate processing, such as Bayer demosaicking, contrast enhancement, application of a tone curve, and encoding to JPEG. Step 416 may also display a preview of the picture just taken and possibly additional information, such as a histogram, on the touchscreen for a short time period.

If desired, the order of steps 410/414 and step 416 may be reversed, i. e. the image is stored to non-volatile memory first and only then is success checked and if successful a tactile feedback signal is given. On many implementation platforms this will cause a noticeable delay between taking the picture and obtaining the tactile feedback, which is undesirable from an ergonomic point of view, but in return the user can be assured that the tactile feedback means that the image has been safely written out and will not be lost even if, for example, the device suddenly were to lose power. The user may also be offered the choice between these two possibilities through a menu setting.

Step 418 loops until the user lets go of the shutter button. Once the shutter button is released, it returns control flow to step 404.

The control flow has been shown and discussed in a single thread of control for greater ease of explanation. In practice, it is often advantageous to distribute control flow over more than one thread of control. For example, there may be separate threads for running the user interface, running the autofocus, running automatic exposure control, processing pictures taken, and storing pictures taken. Control flow may also be distributed over more than one processor, for example with GPU 302 providing image processing and display.

The control flow shown and discussed implements a simple point and shoot camera functionality as this will be most appreciated by casual users. Additional shooting modes may be provided. For example, the camera may provide a continuous picture-taking mode wherein steps 410 and 414 are omitted, allowing for continuous picture-taking while the shutter button is being pressed, in this case without tactile feedback during shooting. Tactile feedback may be provided after the user has released the shutter button and continuous picture-taking has ended. Alternatively, a weak tactile feedback may be provided after each shot and a stronger tactile feedback after continuous picture-taking has finished. The camera may also provide a bracket mode where it takes, for example, three shots with different exposure parameters in rapid succession and only actuates the tactile feedback once the last shot has been taken. In this case, the control logic may be adapted to provide two clicks instead of one so as to indicate to the user that more than one picture was taken from one shutter button actuation. The camera may also provide a video mode, also comprising recording accompanying audio, where a weak tactile feedback is given before the first video frame is taken and a stronger tactile feedback is given once video-taking has successfully ended; the shutter button may serve both to start and to stop recording video.

Figure 5:
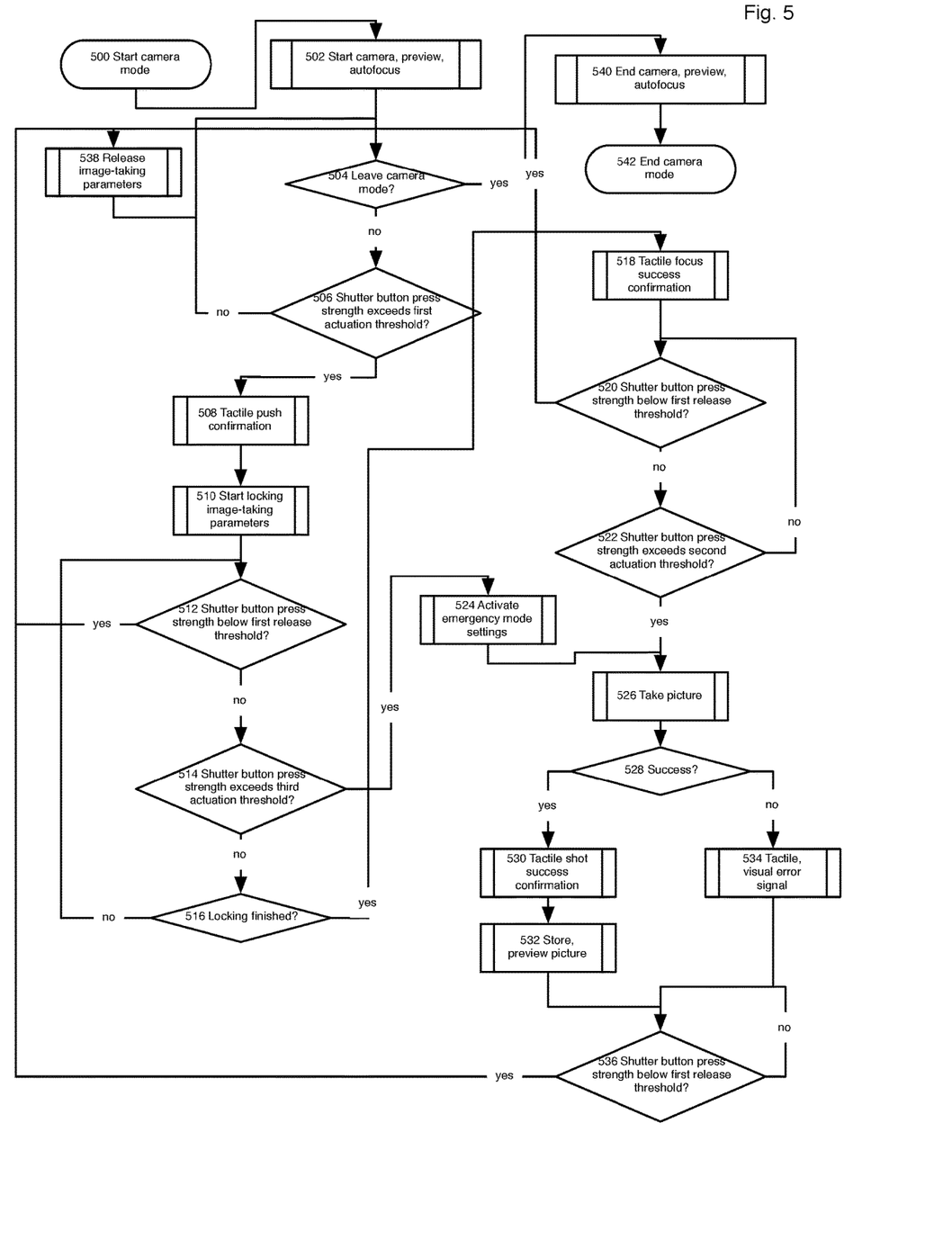
FIG. 5 shows the control flow for the camera shutter control of the second embodiment.
Figure 6:
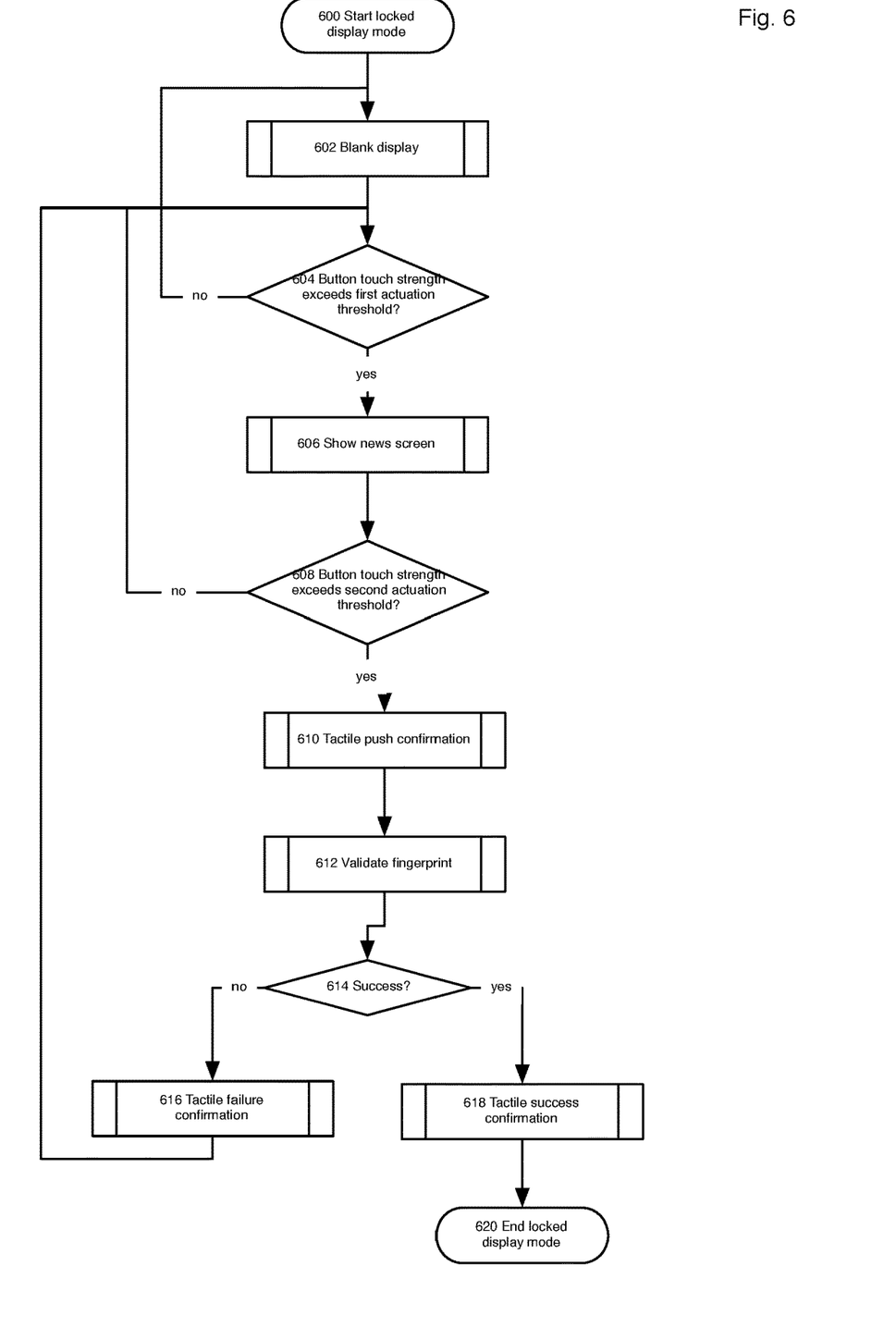
FIG. 6 shows the control flow for the user authentication of the second embodiment.

Second Embodiment—FIGS. 5-6

The second embodiment extends the idea of the first to provide a tactile half-press shutter button function in a camera with a touch-sensitive shutter button.
Physical Construction The physical construction of the second embodiment may be the same as for the first, being realized for example as a smartphone or dedicated camera form factor. However, the volume buttons 106 and 108 are now constructed as buttons mounted on touch sensors that can transmit several levels of touch strength to the CPU 300. For example, the sensors might provide a resolution of eight bit, giving a touch strength reading from 0 for no touch to 255 for the respective button being pressed down very forcefully. The sensors to which the buttons are connected may, as is known in the art, be of a dielectric medium with electrodes mounted on top and bottom, so that pressing the button down compresses this medium slightly, albeit imperceptibly to the user. The capacitance between the two electrodes may be part of an RC or LC oscillator. Then if the button is being pressed, the distance between two electrodes and hence the electric capacity of the capacitor formed by them changes, which changes the frequency of the oscillator. The oscillator frequency may be reported via a data bus to the CPU 300, giving it a reading of the strength which which buttons 106 and 108 are being pressed down.

Alternatively, the sensors may be made as two electrodes between a slightly compressible resistive medium so that when the button is pressed the electrical resistance between the electrodes changes. For example, one may use the sensor MF01-N-221-A04, made by Taiwan Alpha Electronic Co., Ltd., of Taoyuan City, Taiwan, for this purpose. If this resistance is then made part of a voltage divider circuit, the voltage output by that circuit may be fed into an analog/digital-converter, the reading of which again gets reported to the CPU 300 as a reading of button pressure. Other sensor types than capacitive or resistive measurement are possible, for example base on the piezoelectric effect, based upon compression of an elastic body and optical measurement of that compression, and any other force/pressure sensor with a suitable range of measurable pressures known in the art.

The CPU's software may include a calibration routine to calibrate the zero-level reading as the mediums electric properties change over time. For example, the CPU may calculate an exponential moving average (EMA) of the frequency or voltage reading when it is quite close to the reading corresponding to the value known to correspond to zero touch and use this EMA as a the new value corresponding to zero touch. The CPU may then apply a mathematical transformation, such as a linear or quadratic function, to convert the sensor's raw reading into a number corresponding to force applied to a button.

The principal advantages of using pressure sensors instead of traditional on/off buttons for the volume buttons 106 and 108 are flexibility of use and mechanical protection. Flexibility of use is increased because in different operating modes it becomes possible to use the buttons as simple on/off buttons, for example as traditional volume buttons, as buttons with three different pressure levels, for example to replace a traditional half-press camera shutter button that can be off, half-pressed, and fully pressed, and even for quasi-continuous force input, for example to make a steering action in a computer game executed on the CPU proportional in intensity to the strength which which a button is being pressed, giving the player proportional instead of merely on/off input and thus enhancing game play, such as in a game simulating a sport where one may throw a ball with varying levels of force. Force sensors that have only a very small mechanical actuation path can also be constructed much more robust to physical abuse than many traditional switches, and they are much easier to proof against intrusion of water, dirt, and other environmental hazards, such as by a continuous seal between the button caps and the pressure sensors.

The principal disadvantage of pressure sensors instead of traditional buttons is their lack of tactile feedback. Whereas a traditional button may be constructed to give a very nice tactile and possibly audible clicking sensation when actuated and released, a pressure sensor feels more like pressing into a board, with no give and thus no feedback when the user has pressed the button hard enough to actuate it. This problem becomes exacerbated if an application wants to differentiate between different strengths of actuation, for example to emulate a traditional half-press shutter button as is commonly found on a camera. The second embodiment teaches a way to provide this feedback using the tactile actuator 120, principally for use as a camera shutter button with half-press function, but also useful for other applications.

The reader skilled in the art will appreciate that the pressure-sensitive button to be used as a shutter button need not be the volume-up button 108. The volume-down button 106 may be used in the same fashion, but alternatively or in addition to the volume buttons the device may also use an area of the touchscreen 110 as a virtual shutter button 118, in which case the touchscreen 110 is selected to be able to provide a reading of force or pressure of touch, or the multi-purpose button 116, in which case this button is adapted to provide a reading of the force with which it is touched. Using the volume-up button 108 is advantageous, however, in that it places the camera shutter button in an intuitive position that is ergonomic to actuate while holding the phone in a natural way for taking pictures, and in that the force pushing down on the button has less leverage to disturb the camera axis than would be the case when the user has to press the touchscreen 110 or the button 116. On a dedicated camera, the shutter button may be realized as a force-sensitive button in the customary location on the top right from the user's point of view or in another location as may be appropriate for a given form factor.

Operation for Volume Setting

When the buttons 106 and 108 are being used as volume buttons, for example to set ringer volume when the device is in telephone more or to set playback volume when the device executes a media player application, control may work as follows. Both buttons are assigned four touch force thresholds: there is a first-level release threshold, which is smaller than a first-level actuation threshold, which in turn is smaller than a second-level release threshold, which is smaller than a second-level actuation threshold. For example, with a sensor reading force as an eight-bit integer from 0 to 255, these level might be chosen as 30, 40, 90, and 100. When force applied to a button exceeds the first-level actuation threshold, the CPU's (300) software reports the button as being actuated to the first level, and when the force applied to the button falls below the first-level release threshold, the software reports the button as no longer being actuated. The release threshold being lower than the actuation threshold provides hysteresis, as is well known in the design of buttons, so as to prevent oscillation between actuated and unactuated states. Similarly, when the force applied to the button exceeds the second-level actuation threshold, the CPU reports the button as being actuated to the second level, and when the force applied to the button falls below the second-level release threshold, the CPU reports the button as being in first-level actuation if the force still exceeds the first-level release threshold, or otherwise as not being actuated. Thus, the CPU translates the button's actuation force into three actuation levels—unactuated, first-level actuated, and second-level actuated—which may be stored in memory 304 or in a CPU register.

When the CPU senses a first-level actuation of the volume-up button 108 while the device is in a mode where a volume-button function is desirable, such as in phone mode or executing a media player software, the software running on it increases the volume by a step of predetermined size, e.g., one decibel, and may indicate so on a graphical volume display shown on the touchscreen no. Similarly, when the the CPU senses a first-level actuation of the volume-down button 106, the software decreases the volume by a step of a predetermined size and may indicate so on a graphical volume display. When the software senses a second-level actuation of the volume-down button 106, i.e., the button has been pressed with an amount of force significantly more than what is required to reduce the volume, the volume gets set to zero, a graphical display may indicate that the device is in mute mode, and the tactile actuator 120 generates a haptically and possibly also audibly perceptible click to confirm the second-level actuation and the transition of the device to mute mode. This arrangement makes it possible to reduce the device's volume to zero with a single touch without the need for a separate mute switch, thus saving cost, making it easier to make the device water-resistant, and giving a more pleasing design with fewer elements. When the device is in mute mode, a level-two touch on the volume-up button 108, also confirmed graphically and by tactile feedback in the same manner, ends mute mode and restores the previous volume. While the device is in mute mode, it may not respond to level-one actuations of the volume buttons so as to guard against unintended turning up of the volume, and it may indicate that the volume has not been changed with a graphical display.

Operation for Camera Control

FIG. 5 shows a flow chart of a similar, but slightly more complicated logic when the device is in camera mode and it is desirable that button 108 works as a shutter button instead of as a volume button. The control flow shown enables use of the pressure-sensitive volume button 108 as a half-press shutter button with tactile feedback.

In step 500, the device's software starts camera mode, for example because a user selected a camera application on a menu on the touchscreen no. In step 502, the software starts the camera 104, initializes a preview function that continuously shows what the camera sees on the screen no, and enables the camera's continuous autofocus function, if the camera is so equipped, as well as other automatic regulating functions, such as automatic exposure control and automatic white balance control if so equipped. In step 504, the software checks whether it is desirable to leave camera mode, for example because the user pressed an icon on the touchscreen 110 to exit camera mode or because of an incoming phone call. If so, the software shuts off the camera, preview, and autofocus mode in step 540 and returns control to another application, for example an operating system displaying a menu screen, in step 542.

Although the steps in FIG. 5 have been arranged in a single thread of control, not including the threads possibly required for a given hard- and software platform in actions such as starting the camera, in practice it will often be advantageous to split up these actions into different CPU threads of control. For example, step 504 may execute on a separate thread of control run by the operating system. If different threads of control are used, synchronization mechanisms between them, such as semaphores, may be needed as is well known in the art of parallel programming.

For understanding the following control flow a number of different pressure levels for the button 108 are defined that will be referred to in FIG. 5 and this explanation, specifically in ascending order of pressure: first release threshold, first actuation threshold, second release threshold, second actuation threshold, third release threshold, and third actuation threshold. The second and third release thresholds are not actually used in FIG. 5, but will be useful for extensions such as taking multiple pictures with one button press, as will be discussed. These pressure levels work analogously to the ones discussed in the logic for changing volume above, representing four possible states of logical button actuation: Unactuated, first level, second level, and third level, corresponding to increasing actuation forces and with hysteresis preventing uncontrolled oscillation between states.

Step 506 compares the current pressure level read from button 108 to the first actuation threshold. If this threshold is exceeded, i. e., if the button is in first-level or higher actuation because the user pushes it, control proceeds to step 508. If not, control flows back to step 504, which is to say the device continues to display camera previews, operates the autofocus, and waits either for input to leave camera mode or for the user to push the shutter button 108.

Step 508, following a button push, emits a tactile push confirmation through actuator 120. This may be a very slight, barely perceptible click. Its strength and feel may also be user-configurable through a menu. Then step 510 starts locking image-taking parameters. This may be through a signal to the camera module or to a separate thread of control on the CPU that starts a sequence of steps to optimize the autofocus setting and then lock the camera focus as well as to lock the exposure parameters, such as aperture, exposure time, and sensor sensitivity as well as white balance. The steps may take some time. In particular autofocus optimization might involve an algorithm using some amount of trial and error, adjusting the focus slightly back and force until a value is found over which no improvement can be obtained. The amount of time focus optimization takes may also vary depending on the contrast offered by the picture. If the camera is equipped with one or more phase detection sensors and those sensors see an image element with strong contrasts, focus setting might be very speedy, especially if the camera from its continuous autofocus operation in preview mode is already very close to an optimal setting. In a night scene, on the other hand, the only possibility to optimize focus might be to sweep the camera through its lull focus range in order to observe the setting that gives the best contrast on the sensor, which may take several seconds.

While the camera is seeking optimal focus and other image-taking parameters, the control flow iterates through steps 512 through 516. Step 512 checks whether the pressure on the shutter button 108 has fallen below the first release threshold. If so, control jumps to step 538, which ceases preparation for taking an image, as the user has released the shutter button.

Step 514 checks whether pressure on the shutter button has increased to exceed the third threshold, which may be chosen to correspond to a very high pressure unlikely to be attained by accident. This strong button press allows the photographer to take a picture immediately, even though autofocus operation has not yet finished. It also allows the photographer to override exposure settings to a default value for emergency picture-taking for fleeting opportunities. This way a photographer can avoid the well-known frustration of not being able to take a picture since autofocus takes a long time to lock or cannot lock at all or of taking a picture with exposure settings chosen for a well-prepared creative shot when a fleeting opportunity arises, such as unusual behavior by a person or animal, that would make a great snapshot even when taken with suboptimal camera settings. In order to achieve this, step 514 jumps to step 524 for preparation of an emergency photo to be taken immediately.

If the shutter button is not pressed to the third level of pressure, but still pressed to the first level, control jumps to step 516, which checks whether the image-taking parameter locking operation, in particular the autofocus operation, has finished. If not, control returns to step 512, continuing to wait for locking to finish or for an event from the button's actuation force changing. If the locking operation has completed, the camera exposure parameters and focus are now locked. This means that the photographer, using the traditional half-press technique, may recompose the picture while retaining the focus settings and exposure appropriate to the element of interest at which he aimed the camera while the parameters were being locked. Control continues to step 518. This gives a tactile focus success confirmation through actuation of actuator 520, which should be haptically different from the push confirmation in step 508. For example, step 508 might generate a very slight single click and step 518 might generate a somewhat more forceful double click to indicate that the camera is ready to take a picture, after recomposing if desired by the photographer.

Steps 520 and 522 are a loop waiting for the photographer either to push the shutter button harder to take a picture or to release it to unlock image-taking parameters. Step 520 checks whether pressure on the shutter button has fallen below the first release threshold and if so aborts the image-taking operation by jumping to step 538, by the same logic as in step 512. Step 522 checks whether the shutter button pressure exceeds the second actuation threshold. If not, control goes back to step 520, but if it does control goes to step 526 to take a picture.

Step 524 is only executed if the photographer forced a picture to be taken by pushing the shutter button to the third actuation level before autofocus operation was completed, causing a jump from step 514. The camera in its normal mode of operation may give, for example through an on-screen menu, the photographer the option to have the various exposure modes either chosen automatically by the camera or manually by the photographer. For example, there may be a program mode that selects both aperture and exposure time automatically, an aperture-priority mode that sets exposure time automatically based on a manually selected aperture value, a shutter priority mode that sets aperture automatically based on a manually selected exposure time value, and a manual mode that allows the photographer to select both aperture and exposure time manually for optimal creative control. These four modes may be combined with automatically selected or manually selected sensor sensitivity for a total of eight conventional camera modes, and there may be additional more sophisticated modes, such as an automatic mode that seeks to find optimal exposure parameters by inspecting the camera's output and trying to decide whether it falls into a known genre such as portrait, landscape, action, and so on, and selecting optimized exposure parameters for that genre, such as perhaps a wider open aperture for portrait and a more closed one for landscape. Now if the photographer encounters a fleeting opportunity, such as unusual behavior by a human or animal that might not be the intended subject of the shot the photographer was preparing, these settings might be suboptimal. Even if they would be appropriate there is the problem that the autofocus operation has not yet completed and thus it is not known whether the focus setting is appropriate for the fleeting subject. In order to optimize the chances of a successful snapshot, step 524 may set special exposure values instead of what was originally selected for this snapshot. In particular, this may involve closing the aperture if light conditions permit. For example, the photographer might have chosen a wide-open aperture for a portrait or even macro shot when a quick opportunity for a snapshot arrived. Since there is no time to complete autofocus operation, the camera may increase depth of field by closing the aperture, for example from a manually or automatically selected value of f/2.4 to f/8.0. This in turn might force the software to override a chosen sensor sensitivity. This will make the picture grainier, but a grainy picture reasonably in focus will often be preferable to a smooth picture out of focus. The camera may also override a manually or automatically chosen exposure time limiting it to be shorter than would otherwise be desirable, for example no more than 1/320 s in sunlight and no more than 1/60 s in artificial light, again with a corresponding increase in sensor sensitivity. The camera may also ignore any manually set exposure parameter or exposure compensation level, since these presumably were set for a carefully planned shot and not for a quick snapshot of a different subject. Thus the parameters are set by step 524 to compromise values that sacrifice creative control for an increased chance of an at least somewhat useful picture even though autofocus setting has not completed and the photographer has not had the opportunity to adjust parameters manually with a great deal of care. From here control goes to step 526, as it does after completion of step 522.

Step 526 now takes a picture and reads it into memory. This operation may take some time, depending on the construction of the camera sensor and exposure parameters chosen. For example, a digital single-lens reflex camera may need to move a mirror out of the way and operate a mechanical shutter. A camera in a smartphone may allocate computer resources, clear the sensor, and set parameters. The exposure time chosen may also be long enough to cause a perceptible delay before picture-taking is completed. For example, the photographer may have set an exposure time of one second for a night scene, preferably using some form of rest for the camera.

The picture-taking operation may succeed or fail. For example, it may turn out that there is not enough memory 304 available to complete taking and storing the picture or there may simply be a problem with the camera. Step 528 tests whether taking the picture has succeeded, e.g., by validating that a picture was received into RAM and that there is enough flash memory available to store the picture in non-volatile memory. If taking the picture has succeeded, step 530 gives a tactile success confirmation that should be haptically different from the confirmations in steps 508 and 518. For example, the confirmation may be a strong click that can be distinctly felt and heard. This click indicates to the photographer that the picture is safely taken and that he may move the camera. Step 532 displays a preview and finishes storing the picture to non-volatile memory. For extra security of operation at the expense of some additional latency of feedback, steps 530 and 532 may be reversed to give tactile feedback only once the picture has been entirely flushed out into flash memory so that even in the event of a power failure or such it would be safely stored; this behavior may be configurable by the user through a configuration menu. If taking the picture failed, for example because sufficient flash memory could not be allocated or because of a problem with the camera, control goes to step 534, which gives a distinct tactile error message, such as a vibration of some duration, as well as a visual error message on the touchscreen 510.

Step 536 then loops until the user has released the shutter button below the first release threshold and once the user has done so jumps to step 538. Alternatively, continuous picture taking may be enabled by having step 532 after its completion jump not to step 536 but back to step 520. This behavior may be configurable in an on-screen menu that allows the user to select between a single-shot and a continuous-shooting drive mode, as well as possibly other drive modes such as as a self-timer operation.

Step 538 releases any locked image-taking parameters, such as focus and exposure parameters, and returns the device to continuously and automatically updated focus and exposure parameters, the same as it was after step 502. From there control returns to step 504, and the camera is ready to take another picture or leave camera mode, as the user desires.

The camera operation described here provides substantial advances over previously existing methods of camera control. It allows half-press operation of a very compact camera, allowing experienced photographers great creative control of a small form-factor camera, such as one integrated into a smartphone. It also allows photographers to override existing settings or to skip autofocus operation for a quick snapshot to capture a fleeting opportunity in a very quick way, simply by pressing the shutter button harder. This is very intuitive, as a photographer desperate to capture a fleeting opportunity will have a tendency to clamp down on the shutter button with force anyhow, making it quite likely that the feature will work as intended even for a user who is not consciously aware of it. Tactile feedback gives very intuitive confirmation of the various steps of the image-taking process, with the timing of the tactile feedback chosen so as not to introduce vibration during image-taking itself and to provide positive confirmation of an image having been taken. The use of a pressure-sensitive button with a very short travel path and no tactile feedback mechanism or hysteresis built into the button itself—these being provided by software and the tactile feedback generator 120—allows for cost reduction, a smaller form factor, and increased resistance to water and mechanical abuse.

The reader skilled in the art will appreciate that although we discussed camera operation using the volume-up button 108 as the shutter button, other arrangements are possible. For example, with a pressure-sensitive touchscreen display 110, as is, e.g., provided on the iPhone® 6S made by Apple Inc. of Cupertino, Calif., one may use the exact same sequence of operations with an on-screen pressure-sensitive shutter button 118. Alternatively, the home button 116, equipped with the capability to read pressure levels, may also be used as a shutter button, as may any other surface capable of recording pressure in combination with a tactile feedback generator. The shutter button and feedback generator need not even be part of the same physical device. For example, it is possible to use a smart watch, such the Apple Watch® made by Apple Inc. of Cupertino, Calif., with a pressure-sensitive touchscreen and a tactile feedback generator to control a camera in a physically separate device, such as a smartphone or digital single-lens reflex camera mounted on a tripod at a distance, in the manner described in FIG. 5. In this case, the smart watch may report changes in the force with which a virtual camera shutter button displayed on its touchscreen is being depressed though a wireless connection to the camera, which in turn returns instructions for tactile feedback to the smart watch. This is particularly useful to avoid camera disturbance when taking shots with long exposure times or for taking self-portraits.

The volume-down button 106 and virtual buttons on the touchscreen 110 as well as additional buttons or control elements such as might be provided may be used for additional functions. For example, the volume-down button may be configured so that a level-one actuation closes the camera's aperture from fully open, as is advantageous for previewing pictures, to the value to which it would be set where a shot to be taken now, allowing the photographer to preview depth of field. A level-two actuation may lock exposure time, aperture, and sensitivity, but not focus, allowing the photographer to lock exposure for one image element of interest and then focus for another, using the shutter button as discussed above. After the shot is taken, those exposure parameters will be released. A level-three actuation may lock exposure time, aperture, and sensor sensitivity across multiple shots, i. e., disable their unlocking after a show has been taken. This is useful for taking pictures to be stiched into a panorama picture later. A new level-three actuation of the button unlocks the parameters again. The use of additional buttons may be configured among several options in an on-screen menu.

User Authentication

The same mechanism of operation as discussed above for adjusting volume and operating a camera may also be used for unlocking a smartphone. For example, the control button 116 on FIG. 1 may be made as a pressure-sensitive button capable or reporting different pressure levels to the CPU 200, similar to our discussion of the volume buttons above and with the same advantages of cost, size reduction, and easier protection against abuse and the elements. The control button 116 may also include a fingerprint reader for user authentication, as is the case on a number of smartphones popular as of the time of this writing.

FIG. 6 shows the control flow, executed by CPU 200, for a lock screen with user authentication. Step 600 enters locked display mode, as may be caused by user inactivity or by the user selecting an option to lock the screen via actuating button 116 or an on-screen display option. Step 602 blanks the display, saving energy, ensuring privacy, and confirming that the phone is locked.

With the phone being locked, now the question is how to unlock it. The remaining steps in FIG. 6 show the process. Step 604 checks whether the force with which the user is depressing button 116 exceeds a first actuation threshold. Although the chart does not show hysteresis behavior for simplicity of the drawing, hysteresis should be implemented as discussed above for the volume and shutter button logic. That is to say, if step 604 visited the no branch the last time it was executed or is being executed for the first time, it will take the yes branch if the button pressure exceeds a first actuation threshold, and otherwise the no branch. But if step 604 took the yes branch the last time it was visited, it will take the yes branch again unless the button pressure has fallen below a first release pressure chosen to be less than the first actuation pressure, thus providing hysteresis behavior. If the button is being pressed, the yes branch proceeds to step 606. If the button is not being pressed, the no branch returns to step 602, blanking the display.

Step 606 displays a news screen on the display. This may comprise information that does not require authentication and may be of relevance for a quick check to see whether it is even worthwhile to unlock the phone for access to more detailed information. For example, the news screen may include the date and time of day, weather forecast, number of calls received, number of emails received, news headlines, and so on. The contents of the news screen may be configurable by the user through a configuration menu.

Step 608 checks whether the button pressure exceeds a second actuation threshold, again with hysteresis behavior as discussed for step 604. If not, control returns to step 604. In this way, as long as the user touches the button 116 with little force, the news screen will remain visible, and when the user ceases touching button 116, the display will be blanked again. If, however, the user presses the button more forcefully in order to unlock the phone, control will pass to step 610.

Step 610 gives a tactile push confirmation, such as slight click, through actuator 620 to confirm that the user has pressed the button hard enough to start an authentication operation. Then step 612 operates a fingerprint scan through the fingerprint scanner built into button 116. Step 614 branches out depending on whether reading and authenticating the fingerprint was successful. If so, step 618 gives a tactile success confirmation distinct from the push confirmation in step 610, such as a stronger click or a double click, through actuator 120, and ends the locked display mode in step 620, returning the phone to its normal unlocked operation. If reading and authenticating the fingerprint was unsuccessful, step 616 gives a tactile failure confirmation that may be a vibration through actuator 120, alerting the user to reposition the finger and try again (or to stop touching someone else's phone).

In this way, it is possible to give the user immediate and tactile feedback of operating a fingerprint sensor on a smartphone, which is much more intuitive than having to look at the screen to see whether authentication has succeeded. If the user gets the tactile failure confirmation, he will reposition his finger and try again. All of this is possible without even looking at the phone, for example under a desk while in a meeting. The reader skilled in the art will see that variations of this are possible. For example, touchscreen 110 may have a built-in fingerprint sensor in a given area and be pressure-sensitive, in which case that area of the touchscreen may be used instead of a dedicated button 116. Other authentication mechanisms may be used than a fingerprint sensor. For example, instead of checking a fingerprint, step 616 may check for the presence of a user's smart watch or an RFID-enabled finger ring to authenticate the user; in this case no fingerprint sensor is needed, but a wireless link to the authentication object, e. g., through a cryptographically secured connection via Bluetooth.

CONCLUSION, RAMIFICATIONS, AND SCOPE

Accordingly, the reader will see that the camera shown and discussed overcomes difficulties with shutter actuation and feedback that have made it hard in the prior art to obtain good, intuitive feedback when the shutter has been released. Traditional camera shutters that provide good tactile feedback will tend to disrupt the camera just when the shutter is released, introducing shake that may cause blur. Traditional camera shutters that do not provide tactile feedback make it difficult to notice when exactly one has taken a shot, forcing the photographer to observe the camera screen, if so equipped, or to listen for audio feedback played by a loudspeaker, which may be disruptive. The solution shown and discussed avoids these problems by providing tactile feedback, not shortly before the shot has been taken but rather once it has been taken and camera disruption is no longer a problem, and it provides feedback not only about the shutter button being actuated but about the shot having been successfully taken. It can also provide subtle and unobtrusive audible feedback in parallel with the tactile feedback; the combination of tactile and slight audible feedback allows a much weaker audible feedback to register in the user's mind than audible feedback alone.

Tactile feedback once a shot has been safely taken is particularly useful when there is a noticeable lag between shutter actuation and the shot having been safely taken. This is the case, for example, when there is a pronounced shutter delay due to autofocus operation, when a long exposure time is necessary or desired, or when the camera is taking a bracket of several exposures, for example for HDR processing. Tactile feedback so given will indicate to the user that the shot is safely in the box and he no longer has to steady the camera.

The first embodiment has been shown and discussed primarily in terms of a smartphone or portable media player because such devices are at present the most popular type of camera. The invention is not limited, however, to such devices. The touch-sensitive shutter disclosed may be used with equal advantage in a traditional camera format, such as a digital single-lens reflex camera or in new device formats, such as smart wearable devices. Digital single-lens reflex cameras as of today already tend to provide tactile feedback of the shutter being released, but such feedback is becoming less pronounced as shutters get improved to operate more smoothly and quietly, and it goes away entirely as cameras either translate to mirrorless operation or still have a mirror but are primarily being used in 'live mode,' with the mirror folded away both for picture composition and for the picture being taken. Some aspects of the technique shown and described here serve to restore tactile feedback to such cameras as technical progress reduces the tactile feedback naturally provided by the camera operation, with the added benefit of providing feedback about the picture-taking having indeed been successful.

The second embodiment expands upon the solution of the first with the use of force-sensitive buttons made tactile by a dedicated tactile feedback unit. This allows flexibility of use, such as by having three levels of actuation force with tactile feedback in the camera mode discussed, but only two in the volume mode discussed, reduction of size by omitting the travel path and the mechanics of a traditional half-press camera shutter button, an enhanced resistance to mechanical abuse and the elements. Again, aspects of the invention are not limited to implementations in a mobile phones, but may be used with advantage in any portable apparatus taking sensor reading. For example, the tactile feedback mechanism would also be highly advantageous in a pyrometric thermometer for industrial use, indicating with one tactile feedback the start of a measurement and with another its successful completion, or for a portable barcode or RFID tag scanner, again allowing feedback providing tactile confirmation of a successful reading even in a noisy environment without the need to look at a display. In either case, the possibility to use robust pressure sensitive button would increase the device's reliability and likely lower its cost of manufacture.

Although the description above contains many specificities, these should not be construed as limiting the scope of the embodiments but as merely providing illustrations of some of several embodiments. For example, many different switches and other mechanisms, such as electromechanical switches, capacitive and electrostatic touch sensors, approximation sensors, touch screens with and without force detection, and so on may be used as the shutter button. The shutter button need not even be present in the same device as the camera; for example, the same logic of the first embodiment may be used with equal advantage in a portable remote control for a camera, such as a smartwatch, where camera shake is not a problem but tactile feedback that a picture has been taken is all the more useful since the photographer cannot obtain this feedback from the camera itself if he stands away from it. The invention may be embodied in devices of many different form factors. The use of the term 'shutter' in this application is in a wide sense, not restricted to mechanical shutters but also encompassing electronic shutters or simply to retaining a particular picture from a continuous stream of video frames provided by an image sensor. Similarly, a 'shutter control element' is not restricted to a physical button, but may be an area of a touchscreen, a capacitive touch sensor, or any other means of interaction to serve the same purpose.

Thus the scope of the embodiments should be determined by the appended claims and their legal equivalents rather than by the examples given.

I claim:

1. An apparatus comprising:
 a button and a sensor,
 wherein said apparatus differentiates between no actuation, a first level of actuation, and a second level of actuation of said button, said first level of actuation corresponding to a weaker level of force exerted on said button, and said second level of actuation corresponding to a stronger level of force exerted on said button,
 said apparatus being adapted to perform a first sensing operation when said button is actuated at said first level of actuation,
 said first sensing operation comprising performing a preparatory action, awaiting said preparatory action to finish, and a sensing action using said sensor, and
 said apparatus being further adapted to interrupt said preparatory action and to perform a second sensing operation instead when said button is actuated at said second level of actuation,
 where said preparatory action is a precondition that must be completed before said sensing action commences, said precondition being chosen to facilitate, improve, or adjust the result of said first sensing operation, but where said second operation commences without awaiting said preparatory action to be completed,
 where in said first sensing operation said preparatory action comprises optimizing an image-taking parameter of a camera,
 in said first sensing operation said sensing action comprises taking at least one picture by said camera, and
 said second sensing operation comprises taking at least one picture immediately without awaiting completion of said preparatory action optimizing an image-taking parameter.

2. The apparatus of claim 1 where said image-taking parameter is camera focus.

3. The apparatus of claim 1 where said button differentiates between said first level of actuation, said second level of actuation, and a third level of actuation, said third level of actuation corresponding to an even weaker level of force exerted on said button than said weaker level of force corresponding to said first level of actuation, said apparatus being further adapted to initiate said preparatory action when said button is actuated at said third level of actuation.

4. The apparatus of claim 1 where said apparatus further comprises a tactile feedback generator, said apparatus being further adapted to provide tactile feedback upon completion of said second sensing operation.

5. The apparatus of claim 1 where said second sensing operation further comprises modifying an image-taking parameter to a value different from the value used for said first sensing operation.

6. The apparatus of claim 1 where said second sensing operation further comprises reducing the aperture width of said camera compared to the aperture width used for said first sensing action.

7. The apparatus of claim 1 where the transition between said button's first level of actuation and said second level of actuation is subject to hysteresis with respect to the level of force exerted on said button.

8. A machine-implemented method, comprising:
 receiving an actuation level of a button,
 said actuation level being differentiated between no actuation, a first level of actuation, and a second level of actuation, said first level of actuation corresponding to a weaker level of force exerted on said button, and said second level of actuation corresponding to a stronger level of force exerted on said button,
 performing a first sensing operation when said button is actuated at said first level of actuation, said first sensing operation comprising performing a preparatory action, awaiting said preparatory action to finish, and a sensing action using said sensor, and interrupting said preparatory action and performing a second sensing operation instead when said button is actuated at said second level of actuation, where said preparatory action is a precondition that must be completed before said sensing action commences, said precondition being chosen to facilitate, improve, or adjust the result of said first sensing operation, but where said second operation commences without awaiting said preparatory action to be completed, where in said first sensing operation said preparatory action comprises optimizing an image-taking parameter of a camera, in said first sensing operation said sensing action comprises taking at least one picture by said camera, and said second sensing operation comprises taking at least one picture immediately without awaiting completion of said preparatory action optimizing an image-taking parameter.

9. The method of claim 8 where said image-taking parameter is camera focus.

10. The method of claim 8 where said button differentiates between said first level of actuation, said second level of actuation, and a third level of actuation, said third level of actuation corresponding to an even weaker level of force exerted on said button than said weaker level of force corresponding to said first level of actuation, said apparatus being further adapted to initiate said preparatory action when said button is actuated at said third level of actuation.

11. The method of claim 8 further comprising providing tactile feedback upon completion of said second sensing operation through a tactile feedback generator.

12. The method of claim 8 where said second sensing operation further comprises modifying an image-taking parameter to a value different from the value used for said first sensing operation.

13. The method of claim 8 where said second sensing operation further comprises reducing the aperture width of said camera compared to the aperture width used for said first sensing action.

14. The method of claim 8 where the transition between said button's first level of actuation and said second level of actuation is subject to hysteresis with respect to the level of force exerted on said button.

* * * * *